(12) United States Patent
Wirth

(10) Patent No.: US 8,552,388 B2
(45) Date of Patent: Oct. 8, 2013

(54) SENSOR UNIT FOR AN X-RAY DETECTOR AND ASSOCIATED PRODUCTION METHOD

(75) Inventor: Stefan Wirth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 882 days.

(21) Appl. No.: 12/652,757

(22) Filed: Jan. 6, 2010

(65) Prior Publication Data
US 2010/0171038 A1 Jul. 8, 2010

(30) Foreign Application Priority Data
Jan. 8, 2009 (DE) .......................... 10 2009 004 119

(51) Int. Cl.
| G01T 1/166 | (2006.01) |
| A61B 6/00 | (2006.01) |
| G21K 1/02 | (2006.01) |

(52) U.S. Cl.
USPC ................ 250/363.1; 250/363.04; 250/505.1; 378/147; 378/4; 378/21

(58) Field of Classification Search
USPC .................. 250/361 R, 363.04, 363.1, 505.1
See application file for complete search history.

(56) References Cited

U.S. PATENT DOCUMENTS

| 5,965,893 A * | 10/1999 | Tonami et al. ........... 250/370.11 |
| 6,344,649 B2 | 2/2002 | Riedner et al. |
| 6,396,898 B1 * | 5/2002 | Saito et al. ...................... 378/19 |
| 7,247,856 B2 * | 7/2007 | Hoge ........................ 250/363.1 |
| 7,358,501 B2 | 4/2008 | Danzer et al. |
| 7,399,972 B2 | 7/2008 | Yanada et al. |
| 2001/0011709 A1 | 8/2001 | Riedner et al. |
| 2003/0234363 A1 * | 12/2003 | Sekine et al. ............. 250/370.11 |
| 2006/0231767 A1 | 10/2006 | Danzer et al. |
| 2012/0093280 A1 * | 4/2012 | Konno et al. ...................... 378/7 |

FOREIGN PATENT DOCUMENTS

| DE | 19849772 A1 | 5/1999 |
| DE | 102005014187 | 10/2006 |
| DE | 102005014187 A1 | 10/2006 |

OTHER PUBLICATIONS

Office Action for German patent application No. 10 2009 004 119. 2-52 dated Apr. 28, 2010.

* cited by examiner

*Primary Examiner* — David Porta
*Assistant Examiner* — Jeremy S Valentiner
(74) *Attorney, Agent, or Firm* — Harness, Dickey & Pierce, P.L.C.

(57) ABSTRACT

A production method for a sensor unit that includes a scintillator and a support plate on which a stack of collimator sheets is attached. The production method permits precise positioning of the collimator sheets in respect of the scintillator. In the process, individual scintillator strips are initially produced from a plurality of scintillator pixels adjoining one another along one dimension. Respectively one photodiode strip, made of a plurality of photodiodes in turn adjoining one another along one dimension, is attached to each of the individual scintillator strips along a longitudinal side in order to form a sensor strip. In an embodiment, respectively one photodiode is associated with respectively one scintillator pixel for readout purposes. The sensor strips are subsequently individually assembled on an outer side of the support plate facing away from the collimator sheets in order to form the scintillator.

18 Claims, 2 Drawing Sheets

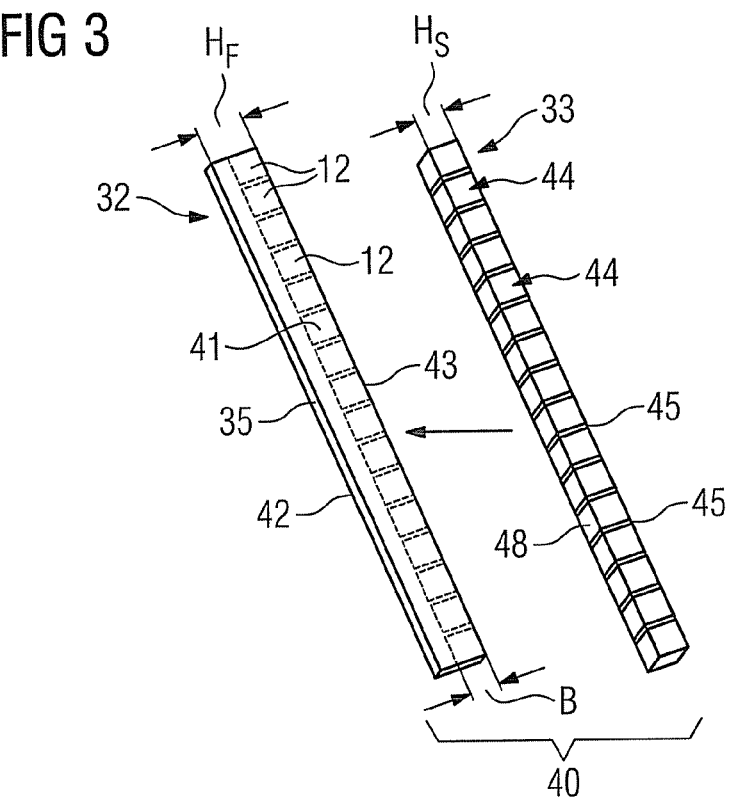
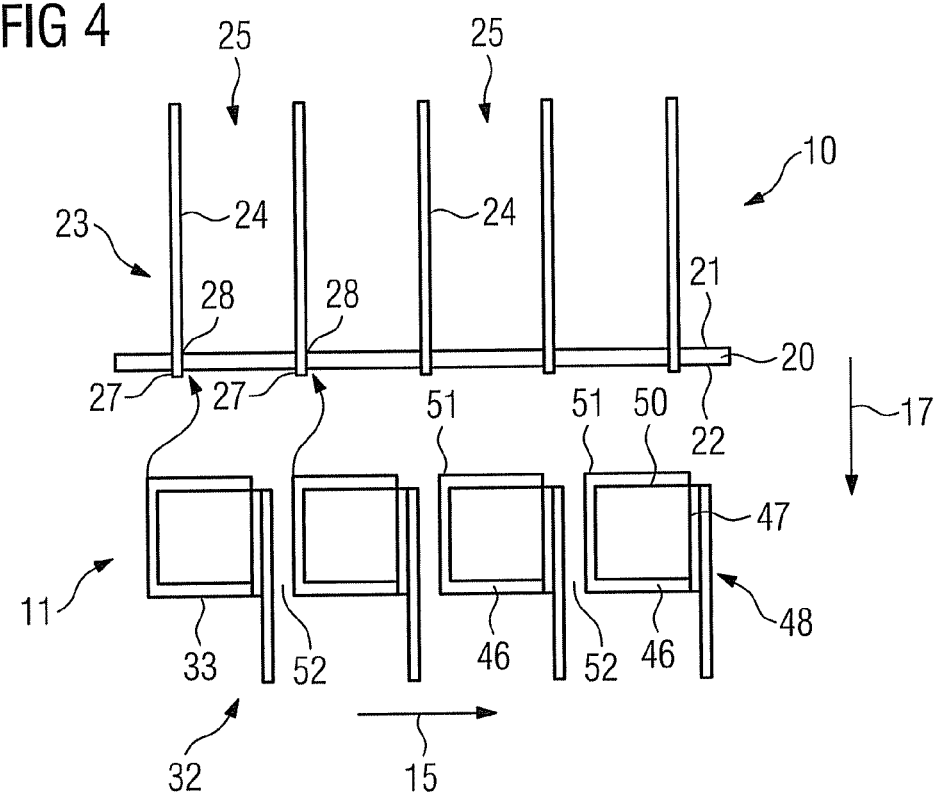

SENSOR UNIT FOR AN X-RAY DETECTOR AND ASSOCIATED PRODUCTION METHOD

PRIORITY STATEMENT

The present application hereby claims priority under 35 U.S.C. §119 on German patent application number DE 10 2009 004 119.2 filed Jan. 8, 2009, the entire contents of which are hereby incorporated herein by reference.

FIELD

At least one embodiment of the invention generally relates to a sensor unit for an X-ray detector, in particular a computed tomography scanner. At least one embodiment of the invention furthermore generally relates to a method for producing such a sensor unit.

BACKGROUND

A computed tomography scanner (CT) usually comprises a so-called gantry, with an X-ray beam source (X-ray tube) and a radially opposite (X-ray) detector being attached thereto. The gantry is intended to rotate around an object to be irradiated, with the X-ray radiation emitted and modified during the penetration of the object being detected by the detector.

The detector is generally assembled from a plurality of individual detector modules. Each detector module comprises a sensor unit which in turn has a scintillator for converting the X-ray radiation into visible light and photodiodes for detecting this light.

The scintillator is normally formed from a plurality of scintillator pixels, usually in the form of cubic elements of scintillating material. The scintillator pixels are generally arranged in an array, that is to say in a matrix arranged in a checkerboard fashion in rows and columns. Narrow interspaces (so-called septa), filled with a light reflecting and/or absorbing material, are in each case formed between the individual pixels; these septa are used to delimit the individual pixels in respect of one another in terms of radiation.

A method for producing such a scintillator is disclosed in, for example, DE 198 49 772 A1. Accordingly, elongate scintillator elements are firstly layered next to and above one another in parallel and bonded to form a block whilst forming the septa. Subsequently, the block is cut into slices, transversely with respect to the longitudinal direction of extent of the scintillator elements, such that the individual slices have the desired array structure.

Within the scope of the sensor unit, each scintillator pixel has one photodiode associated with it. In a conventional sensor unit—as is described, for example, in DE 10 2005 014 187 A1—these photodiodes are arranged in an array matched to the pixel structure of the scintillator, with the array being fitted to the outer side of the scintillator facing away from the X-ray tube.

Each sensor unit is often also assigned a collimator which is used to suppress scattered beams of the X-ray radiation impinging on the scintillator. The collimator is usually formed from a stack of thin tungsten sheets which are attached to a support plate in an upright fashion in respect of the latter. This support plate is usually fitted to an inner side of the scintillator intended to face the X-ray tube. Here, the collimator sheets are respectively arranged approximately flush with the septa, as a result of which the X-ray radiation is incident on the scintillator pixels in a directed fashion.

Since the collimator sheets should not shadow the scintillator pixels in the process, very exact positioning of the former in respect of the scintillator is necessary. Exact positioning of the collimator sheets is difficult, particularly in the case of very small pixels and very narrow septa of the scintillator.

SUMMARY

In at least one embodiment of the invention, a production method for a sensor unit of an X-ray detector is specified which permits particularly precise positioning of the collimator sheets in respect of the scintillator. Furthermore, in at least one embodiment of the invention, a sensor unit is specified in which the collimator sheets are positioned particularly precisely in respect of the scintillator.

In respect of the production method of at least one embodiment, individual scintillator strips are firstly produced from a plurality of scintillator pixels adjoining one another along one dimension. A photodiode strip, made of a plurality of photodiodes in turn adjoining one another along one dimension, is in each case attached (in particular adhesively bonded) to a longitudinal side of each of the individual scintillator strips. Here, respectively one photodiode is arranged adjoining respectively one scintillator pixel for readout purposes. The combination of scintillator strips and photodiode strips is referred to as a sensor strip in the following text. The sensor strips are now respectively mounted individually on an outer side of the support plate of a collimator. In principle, the collimator is assembled as described above, that is to say it comprises a stack of collimator sheets attached to an inner side of the support plate. In the process, the individual collimator sheets are aligned substantially perpendicularly with respect to the support plate, and parallel with respect to one another. The side of the support plate intended to face the X-ray tube is referred to as the inner side of the support plate. Accordingly, the side of the support plate intended to face away from the X-ray tube is referred to as the outer side of the support plate.

Here, "individual" means that the sensor strips are not directly interconnected during assembly. Thus, according to at least one embodiment of the invention, provision is made for assembling the scintillator column by column from the sensor strips which are initially available as individual elements, with each of the sensor strips being individually attached to the support plate of the collimator.

As a result of individually attaching the sensor strips on the support plate, it is possible for each sensor strip—and hence the individual scintillator pixels—to be positioned very precisely in respect of the collimator sheets. In particular, it is possible for the scintillator strips to be aligned flush with the interspaces between the collimator sheets in a very precise fashion and so the X-ray radiation can impinge on the scintillator strips in an unimpeded fashion. Since each sensor strip is attached separately to the support plate, it moreover is possible for a defective sensor strip to be replaced in a comparatively simple fashion.

The positioning of the sensor strips in respect of the collimator being very precise also results in the possibility of being able to produce such a sensor unit made of collimator and scintillator with comparatively narrow scintillator strips (corresponding to small scintillator pixels) and narrow septa. This indirectly affords the possibility of an improved image resolution of the detector.

Since the sensor strips are prefabricated as individual elements, the photodiode strips can also be adjusted with respect to the scintillator strips, and hence the photodiodes can be adjusted with respect to the scintillator pixels, in a particularly simple and precise fashion. In particular, this can advantageously be carried out with the aid of a stop. Moreover, the production of the sensor strips can be automated particularly well. In the process, there is no, or only very little, risk of damaging the light-sensitive surface of the photodiodes.

The individual production of the sensor strips moreover also affords the possibility of reducing the waste during the production of the sensor units since each sensor strip can be checked separately in respect of both the stability of the connection between the photodiode strip and scintillator strip and in respect of the functionality thereof.

In particular, the individual sensor strips are respectively aligned substantially parallel to the collimator sheets and are respectively arranged flush with the interspaces formed between two collimator sheets.

Expediently each of the sensor strips respectively has the same number of scintillator pixels. Overall, in an expedient refinement, a (substantially rectangular) scintillator is therefore formed on the outer side of the support plate, the individual scintillator pixels of which scintillator being arranged in an array structure of rows and columns.

In an advantageous embodiment of the method, the sensor strips are, during the assembly on the support plate, aligned with a stop which is fixed in respect of the collimator sheets. This benefits the automation of the production method. Here, the collimator sheets themselves preferably form the stop, in particular by the collimator sheets being integrated into the support plate such that a narrow side of each sheet in each case at least partly protrudes beyond the outer side of the support plate.

Advantageously, the sensor strips—at least the respective scintillator strip thereof—are applied laterally to the collimator sheet serving as a stop in this embodiment. As a result, this very simply precludes (the surface of the scintillating material of) the sensor strips from lying in the shadow of the respectively associated collimator sheet.

When assembling the sensor strips, the photodiode strips can in principle be arranged either on a side of the scintillator strip (parallel to the support plate) facing away from the support plate in the assembled state or on a side face of the scintillator strip (perpendicular to the support plate) adjacent to the support plate in the assembled state. However, in a particularly advantageous embodiment of the method, each sensor strip is respectively oriented during the assembly such that the respective photodiode strip is basically aligned perpendicularly with respect to the support plate, and hence it is aligned parallel to the collimator sheets.

In the process, the photodiode strips are in particular arranged approximately flush with the collimator sheets. Hence the photodiode strips are protected in a particularly effective fashion from the X-ray radiation.

In a further advantageous embodiment of the method, during the assembly on the support plate provision is made for the interspaces formed between the individual sensor strips to be filled after the sensor strips are fixed on the support plate, in particular using a casting resin, for example epoxy resin. This subsequently forms a particularly stable combination of the individual sensor strips and the sensor unit.

In an embodiment of the production method which can be implemented particularly easily, the photodiode strips are adhesively bonded to the scintillator strip using an optically transparent adhesive in order to form the sensor strips.

The scintillator strips are preferably made from substantially cube-shaped scintillator pixels. Here, in preferred dimensioning, the individual cubes each have edge lengths of approximately 0.5 to 3 mm.

In the process, individual beams of scintillator material expediently firstly lined up parallel to and at a certain distance from one another in order to produce the scintillator strips. The individual beams are connected to form a palette by filling the interspaces with a light reflecting and/or absorbing material, for example a polymer which is liquid at first. Said palette is subsequently separated out, in particular sawed, into the individual scintillator strips in the transverse direction in respect of the individual beams. Each emerging scintillator strip therefore is subdivided along the length thereof into—cuboid—scintillator pixels delimited in respect of one another.

In an advantageous embodiment of the production method, the sides of each scintillator pixel not intended to adjoin a photodiode are already provided with a reflector lacquer before the sensor strip is produced and thus, possibly, before the scintillator strip is produced as well. Since each scintillator strip is initially available as a separate individual part, the application of the reflector lacquer on the entire side face thereof (and hence on the outside side faces of the scintillator pixels thereof) in particular can be carried out particularly well. As intended, the reflector lacquer reflects the visible light emitted by the individual scintillator pixels. This increases the radiation intensity incident on the photodiode.

In respect of the sensor unit of at least one embodiment, provision is made for a sensor unit with a support plate on which, firstly, a stack of collimator sheets is attached (in each case substantially perpendicularly to same) and on which, secondly, a plurality of sensor strips are attached. Here, each sensor strip is respectively formed by a scintillator strip and a photodiode strip. Moreover, each of the sensor strips is individually positioned, in particular substantially parallel in respect of the collimator sheets, respectively flush with the interspaces of said sheets and attached to the support plate.

Such a sensor unit is preferably used for a detector in a computed tomography scanner.

In the case of a sensor unit in which the photodiode strips are aligned perpendicularly with respect to the support plate, said strips are in each case basically enclosed between two scintillator strips. The readout of the scintillator pixels is therefore performed laterally. The photodiode strips are in this case preferably arranged flush with the collimator sheets. In the process, the individual photodiode strips are expediently dimensioned such that a narrow side thereof provided in each case for contacting the photodiodes protrudes beyond the adjacent scintillator strip or strips. Therefore, the photodiodes can be contacted from an outer side of the scintillator facing away from the support plate.

As a result of being able to contact the photodiodes on the outer side of the scintillator, the sensor unit of this design is particularly suitable for a flat-panel detector of a CT. Such a flat-panel detector is made of a multiplicity of detector modules arranged adjacently to one another, over an area, with a very small spacing (in both a plurality of rows and a plurality of columns).

Here, the electronics of each detector module required for the readout of the photodiodes are preferably arranged in turn in a vertical arrangement—perpendicular with respect to the scintillator surface—on the outer side of the scintillator, as intended.

BRIEF DESCRIPTION OF THE DRAWINGS

In the following text, an example embodiment of the invention will be explained in more detail on the basis of a drawings, in which.

Figure 1:
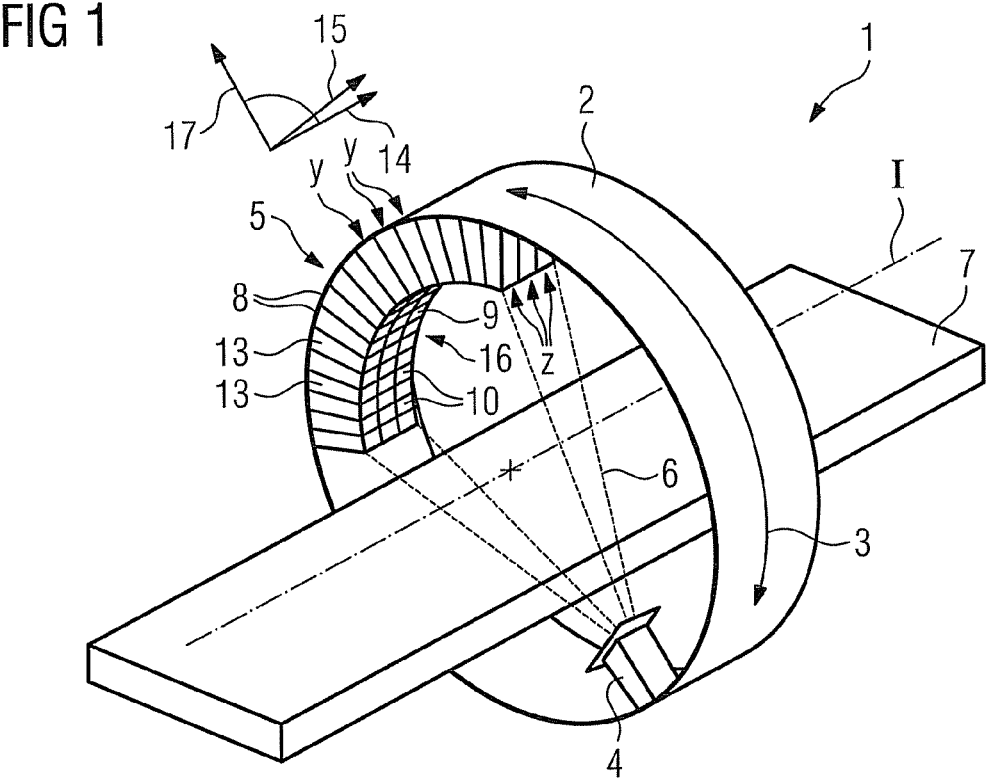
FIG. 1 shows a schematic, perspective illustration of a computed tomography scanner with an X-ray detector which comprises a multiplicity of detector modules with respectively one sensor unit.

Equivalent parts and dimensions are always provided with the same reference signs in all figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 illustrates a computed tomography scanner 1 in a roughly schematic, simplified illustration.

The computed tomography scanner 1 comprises a basically annular gantry 2 which can rotate about an isocentric axis I of the computed tomography scanner 1 (indicated by a double-headed arrow 3).

Attached to the gantry 2 is, firstly, an X-ray tube 4 and, secondly, a detector 5 for detecting the X-ray radiation 6 emanating from the X-ray tube 4, the detector lying substantially opposite to said X-ray tube.

A patient is, as intended, positioned in the region of the isocentric axis I (within the gantry 2) for irradiation purposes with the aid of a patient couch 7.

The detector 5 is assembled from a multiplicity of basically cube-shaped detector modules 8.

Each detector module 8 firstly comprises a sensor unit 10 respectively on a top side 9 intended to face the X-ray tube 4, which sensor unit in turn comprises a scintillator 11 (FIG. 2) for converting the X-ray radiation 6 into visible light. A multiplicity of photodiodes 12 (FIG. 3) are integrated into each sensor unit 10 for the purpose of detecting the visible light. Secondly, each detector module 8 comprises an elongate electronics unit 13 intended to face away from the X-ray tube 4, which electronics unit inter alia contacts the photodiodes 12 for readout purposes.

In an assembled state shown in the present illustration, the individual detector modules 8 are, in respect of the gantry 2, fitted adjacent to one another over an area in a plurality of rows Z in an axial direction 14 and in a plurality of columns Y in a tangential direction 15, wherein all sensor units 10 together form a detector area 16. In respect of the respectively associated sensor unit 10, the electronics units 13 are arranged offset toward the outside in a radial direction 17.

Figure 2:
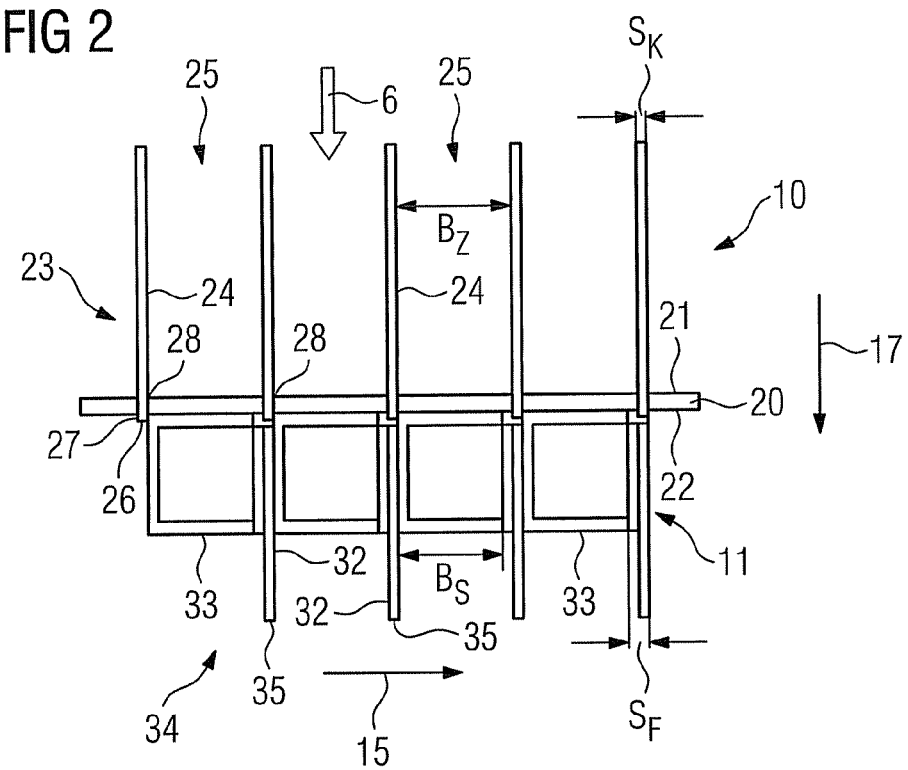
FIG. 2 shows, in a side view, a sensor unit as per FIG. 1 formed from a collimator, a scintillator and associated photodiodes, and FIG. 3 and FIG. 4 respectively show in a schematic exploded view, intermediate products which follow one another of a method for producing the sensor unit.

FIG. 2 illustrates a side view of one of the sensor units 10 separately from the others. For orientation purposes, the radial direction 17 and the tangential direction 15 are illustrated in accordance with the intended installed situation as per FIG. 1. Here, the axial direction 14 points into the plane of the drawing.

The sensor unit 10 comprises a rectangular support plate 20. The inner side 21 thereof is intended to face the X-ray tube 4, while the outer side 22 thereof opposite thereto is intended to face away from the X-ray tube 4.

A collimator 23 made of a stack of tungsten collimator sheets 24 is attached to the support plate 20 on the inner side 21. Here, the individual collimator sheets 24 are aligned approximately parallel with respect to one another, with each collimator sheet 24 sticking out from the support plate 20 at a substantially right angle. The X-ray radiation 6 is, as intended, incident in a substantially perpendicular fashion on the support plate 20 in the interspaces 25 formed between the collimator sheets 24 (in the tangential direction 15). For attachment purposes, each collimator sheet 24 is, on a narrow side 26, led through openings 28 of the support plate 20 in a substantially accurately fitting fashion with in each case a plurality of finger-like protrusions 27, and hence said collimator sheet is fixed. Each protrusion 27 in this case protrudes beyond the support plate 20 on the outer side 22 of the latter.

The scintillator 11 is attached to the outer side 22 of the support plate 20. The scintillator 11 is assembled from a multiplicity of photodiode strips 32 and scintillator strips 33. In the process, each photodiode strip 32 and each scintillator strip 33 is aligned along the axial direction 14. The photodiode strips 32 and scintillator strips 33 are respectively arranged alternately next to one another and are interconnected in the tangential direction 15. Here, the width $B_S$ (in the tangential direction 15) of each scintillator strip 33 approximately corresponds to the width $B_Z$ of an interspace 25. The thickness $S_F$ (again in the tangential direction 15) of each photodiode strip 32 approximately corresponds to the thickness $S_K$ of the individual collimator sheets 24. Each scintillator strip 33 is in each case arranged on the other side of an interspace 25. As a result of the above-mentioned dimensioning, the scintillator strip 33 in this case respectively lies in the region irradiated by the X-ray radiation 6, while the photodiode strips 32 are at least partly protected from the X-ray radiation 6 by the collimator sheets 24.

A narrow side 35 of the photodiode strips 32 respectively protrudes beyond the scintillator strips 33 on an outer side 34 of the scintillator 11 facing away from the support plate 20. The photodiodes 12 integrated in the photodiode strip 32 can be contacted by way of the electronics unit 13 on this narrow side 35.

In order to produce the sensor unit 10 as per FIG. 2, the method illustrated on the basis of FIGS. 3 and 4 is applied. In the process, as illustrated in FIG. 3, a photodiode strip 32 and a scintillator strip 33 are initially joined to form a so-called sensor strip 40.

A multiplicity of photodiodes 12 are arranged adjacent to one another on the photodiode strip 32 (along the length thereof). The side of the photodiode strip 32 on which the light-sensitive surfaces of the photodiodes 12 are attached is referred to as the front side 41 thereof. The side of the photodiode strip opposite to the front side is referred to as the backside 42 of the photodiode strip. On the front side 41, the photodiodes 12 are arranged laterally offset with respect to the longitudinal direction in the region of a first narrow side 43, while the narrow side 35 of the photodiode strip 32 opposite thereto has electrical contacts (not illustrated in any more detail) affixed to it for connecting the photodiodes 12 to the electronics unit 13.

The scintillator strip 33 is assembled from a multiplicity of cube-shaped scintillator pixels 44 which are arranged adjacent to one another in the longitudinal direction of the scintillator strip 33. Here, the number of scintillator pixels 44 corresponds to the number of photodiodes 12 on one of the photodiode strips 32.

Each scintillator pixel 44 is formed by a cube of scintillating material. Two adjoining scintillator pixels 44 are in this case respectively delimited—optically—from one another in the longitudinal direction by a so-called septum 45.

Each scintillator pixel 44—possibly even before the production of the scintillator strip 33—is covered by a layer 46 (FIG. 4) of reflector lacquer on five sides, which lacquer reflects the visible light being generated in the pixel. The side 47 of each scintillator pixel 44 respectively not coated by reflector lacquer (FIG. 4) in each case faces the front side 48 of the scintillator strip 33 (not visible here).

This front side 48 of the scintillator strip 33 is adhesively bonded onto the front side 43 of the photodiode strip 32 in the region of the photodiodes 12 using an optically transparent adhesive.

During the bonding process, the photodiode strip 32 is, using a stop, aligned in respect of the scintillator strip 33 such that respectively one scintillator pixel 44 is arranged on respectively one photodiode 12. In the process, the height $H_F$ of the photodiode strip 32 is greater than the height $H_S$ of the scintillator strip 33. Accordingly, the narrow side 35 of the photodiode strip 32 protrudes beyond the scintillator strip 33. The height $H_S$ of the scintillator strip 33 (or of a scintillator pixel 44) approximately corresponds to the width B of a photodiode 12.

FIG. 4 shows that, during the assembly, a side face 50 adjoining the front side 48 of the scintillator strip 33 is aligned approximately flush with the narrow side 43 of the photodiode strip 32, wherein the layer 46 of reflector lacquer protrudes beyond the photodiode strip 32 on this side.

FIG. 4 also shows that a plurality of sensor strips 40 produced as per FIG. 3 are finally adhesively bonded onto the support plate 20 and in the process form the scintillator 11 or the sensor unit 10. In the process, the individual sensor strips 40 are respectively aligned along the protrusions 27 serving as stops with an edge 51 of the coated side face 50 facing away from the photodiode strip 32. The coated side face 50 is adhesively bonded onto the support plate 20 in a planar fashion.

In principle, it is also feasible in this case for the sensor strips 40—in the case of suitable dimensioning of the photodiode strips 32—to be adhesively bonded onto the support plate 20 such that the photodiode strips 32 are arranged on the side of the sensor strip 40 facing away from the support plate 20.

Subsequently, the interspace 52 respectively existing between two sensor strips 40 is filled with a casting resin. Hence, the individual scintillator pixels 44 are arranged on the support plate 20 in an array structure. In the process, the individual scintillator pixels 44 are delimited from one another by the septa 45 in the longitudinal direction (which corresponds to the axial direction 14); by contrast, they are basically delimited from one another by the photodiode strips 32 in the transverse direction (tangential direction 15).

As a result of the presented production method, each scintillator strip 33 is in each case arranged very precisely in the region of an interspace 25 of the collimator 23.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for producing a sensor unit having a support plate, a stack of collimator sheets being attached on an inner side of the support plate, the method comprising:
producing a plurality of scintillator strips, each of the plurality of scintillator strips being produced from a plurality of scintillator pixels adjoining one another along one dimension;
forming a plurality of sensor strips, each of the plurality of sensor strips being respectively formed by a longitudinal side of one scintillator strip being connected to a respective one photodiode strip made of a plurality of photodiodes, adjoining one another along one dimension such that, for readout purposes, respectively one of the plurality of photodiodes is respectively associated with one of the plurality of scintillator pixels; and
individually mounting a plurality of the formed sensor strips on an outer side of the support plate, facing away from the stack of collimator sheets, wherein a narrow side provided for contacting the photodiodes of each of the photodiode strips respectively protrudes beyond the adjacent scintillator strip or strips.

2. The method as claimed in claim 1, wherein the sensor strips are, during the assembly on the support plate, respectively aligned with a stop which is fixed with respect to the collimator sheets.

3. The method as claimed in claim 2, wherein the sensor strips are aligned with a stop formed by the collimator sheets.

4. The method as claimed in claim 1, wherein, during the assembly of the sensor strips on the support plate, the photodiode strips are respectively aligned substantially perpendicularly with respect to the support plate.

5. The method as claimed in claim 4, wherein, during the assembly of the sensor strips on the support plate, the photodiode strips are respectively arranged substantially flush with the collimator sheets.

6. The method as claimed in claim 1, wherein, during the assembly on the support plate, interspaces formed between the individual sensor strips are subsequently filled.

7. The method as claimed in claim 1, wherein the photodiode strip is adhesively bonded to the scintillator strip using an optically transparent adhesive in order to produce the sensor strip.

8. The method as claimed in claim 1, wherein the individual scintillator pixels are produced in a substantially cuboid shape.

9. The method as claimed in claim 1, wherein individual beams of scintillator material are initially lined up parallel to and at a certain distance from one another in order to produce the scintillator strips, wherein the beams are subsequently connected by filling septa with at least one of a light reflecting and absorbing material and wherein this combination is finally separated out into the individual scintillator strips in the transverse direction of the individual beams.

10. The method as claimed in claim 1, wherein the five sides of each scintillator pixel not intended to adjoin a photodiode are provided with a reflector lacquer before the sensor strip is produced.

11. A sensor unit, comprising:
a support plate;
a stack of collimator sheets attached to the support plate;
a plurality of sensor strips attached to the support plate, each of the plurality of sensor strips being respectively formed by a scintillator strip and a photodiode strip, and each of the plurality of sensor strips being individually attached to the support plate, wherein a narrow side provided for contacting the photodiodes of each of the photodiode strips respectively protrudes beyond the adjacent scintillator strip or strips.

12. The sensor unit as claimed in claim 11, wherein each of the plurality of sensor strips are attached to the support plate such that the photodiode strips are respectively arranged substantially perpendicularly to the support plate, wherein each of the plurality of photodiode strips are each basically arranged between two scintillator strips.

13. The sensor unit as claimed in claim 12, wherein the photodiode strips are arranged such that the photodiode strips are substantially flush with the collimator sheets.

14. The method as claimed in claim 2, wherein, during the assembly of the sensor strips on the support plate, the photodiode strips are respectively aligned substantially perpendicularly with respect to the support plate.

15. The method as claimed in claim 3, wherein, during the assembly of the sensor strips on the support plate, the photodiode strips are respectively aligned substantially perpendicularly with respect to the support plate.

16. The method as claimed in claim 6, wherein, during the assembly on the support plate, interspaces formed between the individual sensor strips are subsequently filled using a casting resin.

17. The method as claimed in claim 9, wherein the beams are subsequently connected by filling the septa with a polymer which is liquid at first.

18. The sensor unit as claimed in claim 11, wherein the sensor strips include a single row of scintillator pixels attached to a single row of photodiodes.

\* \* \* \* \*